United States Patent [19]

Inoue et al.

[11] Patent Number: 4,552,045
[45] Date of Patent: Nov. 12, 1985

[54] POSITIONING DEVICE

[75] Inventors: Mamoru Inoue; Shoji Hara; Morimichi Hasegawa, all of Hirakata; Kiyokazu Imanishi, Higashi Osaka, all of Japan

[73] Assignee: Matsushita Electric Industrial Co., Ltd., Osaka, Japan

[21] Appl. No.: 486,292

[22] PCT Filed: Jul. 14, 1982

[86] PCT No.: PCT/JP82/00267
§ 371 Date: Jul. 5, 1983
§ 102(e) Date: Jul. 5, 1983

[87] PCT Pub. No.: WO83/00302
PCT Pub. Date: Feb. 3, 1983

[30] Foreign Application Priority Data

Jul. 15, 1981 [JP] Japan .................. 56-111475
Jul. 15, 1981 [JP] Japan .................. 56-111476

[51] Int. Cl.[4] .................. B23B 21/00; B23B 3/28
[52] U.S. Cl. .................. 82/21 R; 82/19
[58] Field of Search .................. 82/19, 21 R

[56] References Cited

U.S. PATENT DOCUMENTS 2,663,977 12/1953 Gerard et al. .................. 82/19
2,934,812 5/1960 Allen .................. 82/21 R
3,492,897 2/1970 Cunningham et al. .................. 82/21 R
3,708,923 1/1973 Youden .................. 51/165.93
3,946,471 3/1976 Link .................. 82/21 R

FOREIGN PATENT DOCUMENTS 51-61080 5/1976 Japan .
1038823 8/1966 United Kingdom .................. 82/21 R
688291 9/1979 U.S.S.R. .................. 82/19

Primary Examiner—Francis S. Husar
Assistant Examiner—William E. Terrell
Attorney, Agent, or Firm—Wenderoth, Lind & Ponack

[57] ABSTRACT

A positioning device includes an X-direction slide table and a Y-direction slide table which are slidable in directions perpendicular to each other. Stops are adjustable as to their relative positions with respect to the slide tables to define accurate stop positions of the slide tables. Cams and levers shift the slide tables. Biasing devices bias the slide tables against the stops. A linear drive shifts at least one of the slide tables over a predetermined distance against the respective biasing device.

4 Claims, 16 Drawing Figures

POSITIONING DEVICE

TECHNICAL FIELD

This invention relates to a positioning device adapted to position a workpiece, a tool or the like on a lathe or other machine for machining a revolving workpiece with a tool. The positioning device provided by this invention ensures, among other things, a high positioning accuracy and an improved machining efficiency.

BACKGROUND ART

With the increasing demand for precision-machined parts, a variety of positioning devices have recently been developed and put to use to meet the demand. A conventional positioning device will first be explained with reference to FIGS. 1 and 2 which illustrate a cam-type lathe incorporating the device. A headstock 1 includes a main spindle 2 fitted with a chuck 3 adapted to rotate a workpiece 4. A tool 5 is secured by a tool holder 6 and a tool mount 7 to a table 9 adapted to move in opposite X-directions. Table 9 and a table 10, adapted to move in opposite Y-directions, are driven respectively by cams 13 and 14 through links 11 and 12. A stop 15 is provided to limit the position of the table 10.

Figure 2:
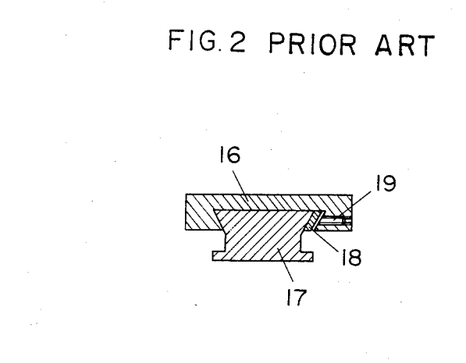
FIG. 2 is a cross-sectional view taken along the line AA' of FIG. 1.

As illustrated in FIG. 2 table 9 and table 10 are each so designed that a movable section 16 thereof shifts along a guide 17. Because the sliding movement of the movable section 16 of the table relative to the guide 17 must be suitably accurate, it is common practice to interpose contrivances such as a sliding member 18 and a screw 19 associated therewith to apply a preliminary pressure as shown in FIG. 2. However, if a preliminary pressure is applied to the sliding member 18, a large frictional force is generated between the guide 17 and the movable section 16 of the table to cause a "stick slip" which leads to decreased accuracy.

Figure 1:
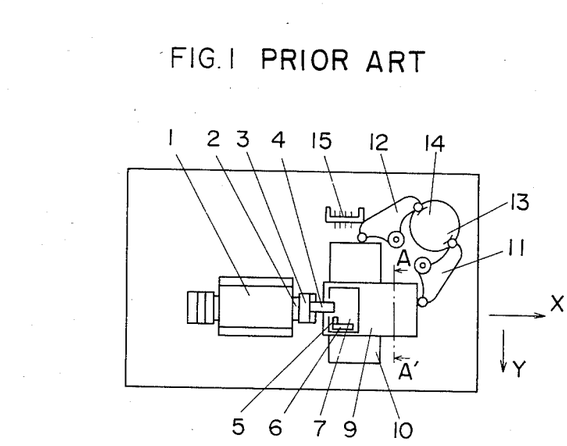
FIG. 1 is a schematic plan view showing the conventional cam-type lathe.

Moreover, when the stop 15 is utilized to limit the position of table 10, the stop is caused to undego elastic deformation by the force acting thereon from the table 10, and this means that the force with which table 10 abuts the stop 15 must be constant in order to maintain constant the amount of elastic deformation. Thus, the friction force generated between the movable section 16 and the guide 17 influences the magnitude of forces with which the table 10 contacts the stop 15, with the result that positioning accuracy is adversely affected.

It may be contemplated to employ balls or rollers in lieu of sliding member 18 to reduce the friction force by way of a rolling mechanism, but such an arrangement has been found to be of little practical value for achieving high-precision positioning because of dimensional variation of the balls or rollers.

SUMMARY OF THE INVENTION

This invention relates to a positioning device comprising an X-direction carriage or slide table and a Y-direction cross slide or slide table which are slidable in two directions perpendicular to each other, stops which delimit accurate stop positions for the slide tables, cams and levers for shifting the slide tables, biasing the means for biasing the two slide tables toward the stops and linear drive means for shifting at least one of the two slide tables over a predetermined distance against the respective biassing means. In accordanace with this invention, the two slide tables are accurately positioned by the cams and levers in association with the stops, and when a replacement of the workpiece on the tables or of the tool is necessary, the slide tables are shifted by the linear drive means from a machining position to a position that permits easy replacement, whereby high-precision positioning over a long period of time can be assured.

BEST MODE FOR CARRYING OUT THE INVENTION

Figure 3:
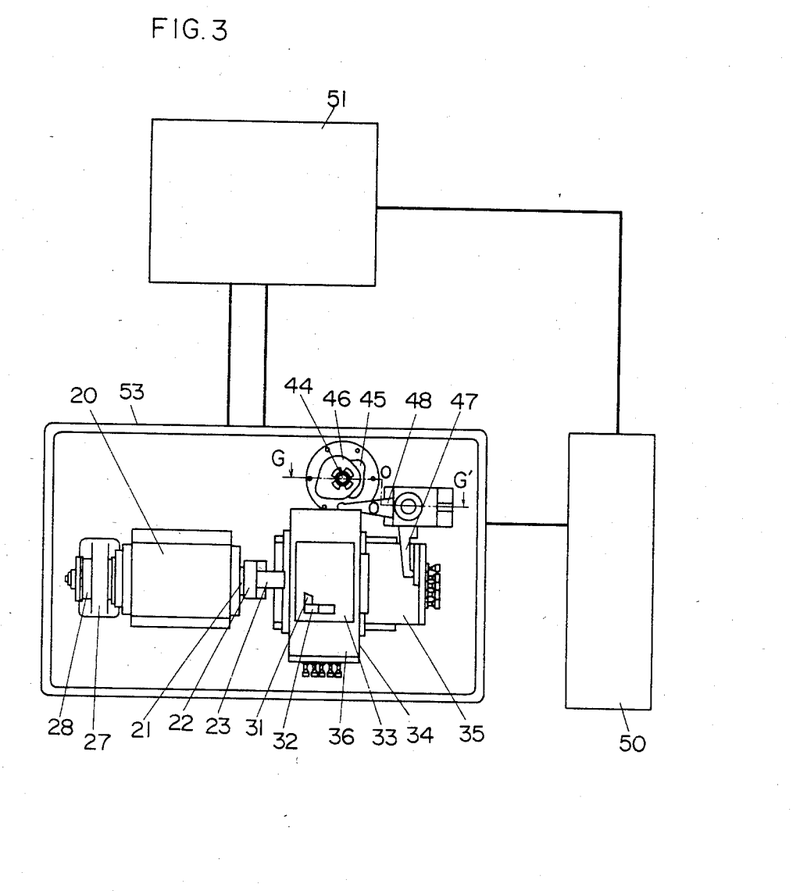
FIG. 3 is a plan view showing a lathe as an embodiment of this invention.
Figure 4:
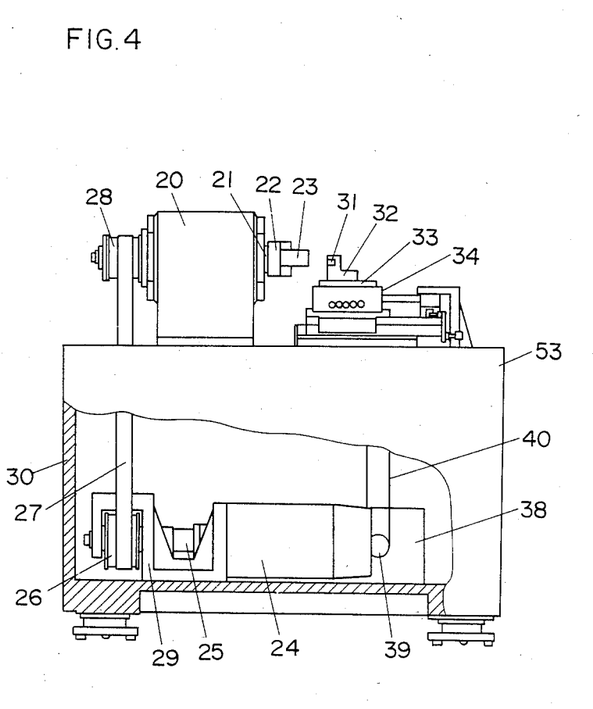
FIG. 4 is a front view in partial section of the lathe of FIG. 4.

FIG. 3; which is a plan view showing the lathe as an embodiment of this invention, gives a layout of the hydraulic unit and control unit which are ancillary equipment. FIG. 4 is a front view of the lathe of this embodiment, while FIG. 5 is a side-elevation view of the same.

Figure 5:
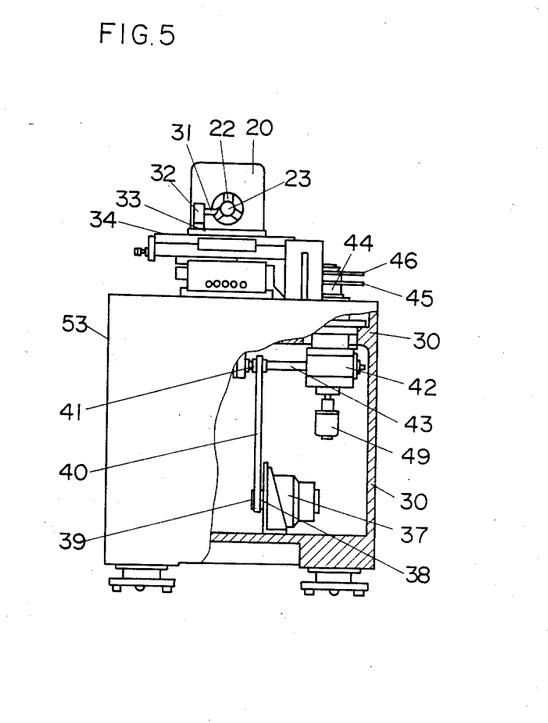
FIG. 5 is a side-elevation view in partial section of such lathe.

Referring to FIGS. 3 to 5, a main spindle 21 of a headstock 20 is fitted with a chuck 22 which, in turn, supports a workpiece 23. The spindle 21 is driven as the rotation of a belt pulley 26 coupled to a spindle motor 24 via a coupling 25 is transmitted to a pulley 28 via a flat belt 27. The spindle motor 24 is rigidly secured to a frame 30 by means of a bracket 29.

On the other hand, a tool 31 is attached to a slide table section 34 by a tool holder 32 and a tool mount 33. The slide table section 34 consists of a carriage or slide table 35 and a cross slide or table 36 respectively movable in the X and Y directions.

A cam shaft motor 37 is mounted on the frame 30 via a bracket 38 and the output of the cam shaft motor 37 is transmitted to an input shaft of a speed reducer 42 through a pulley 39, a timing belt 40 and a pulley 41. Rotation of the input shaft 43 of speed reducer 42 results in the rotation of a cam shaft 44 which is an output shaft and, as a consequence, an X-cam 45 and a Y-cam 46 mounted on the cam shaft 44 are rotated to drive the table 35 and table 36 via respective levers 47 and 48. In addition, cam shaft 44 is connected to an encoder 49 which transmits a pulse signal representing the rotational position of the camshaft as a detection signal to a control unit 50.

Referring to FIG. 3, a hydraulic unit 51 which is an oil pressure generator is designed to supply hydraulic oil to hydrostatic fluid bearing sections of the headstock 20 and slide table section 34. Control unit 50 controls the operation of hydraulic unit 51 and a lathe body 53 based on signals outputted from the encoder 49.

The foregoing is a brief description of the lathe construction provided by this invention. The component elements of the lathe will hereinafter be described in detail.

Figure 6:
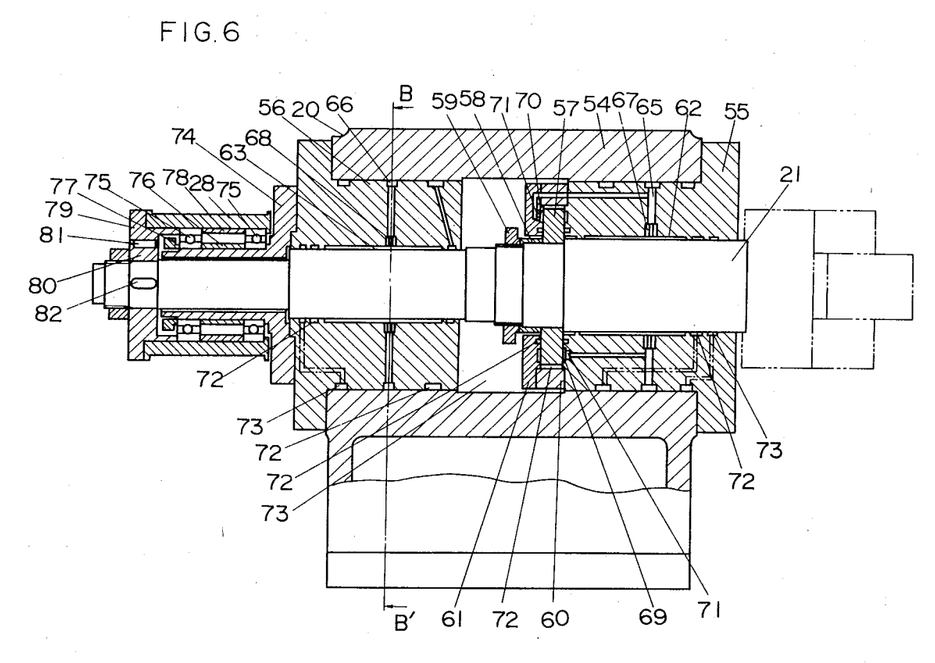
FIG. 6 is a front view in section of the headstock thereof.
Figure 7:
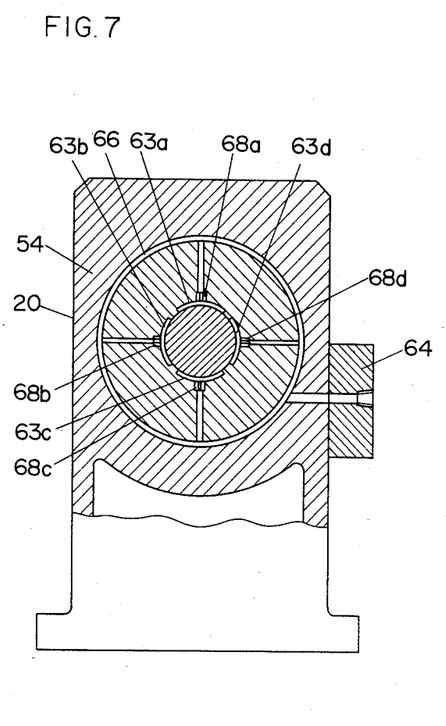
FIG. 7 is a cross-sectional view of such headstock taken along the line BB' of FIG. 6.

FIG. 6 is a front view showing the headstock 20 in cross-section, and FIG. 7 is a cross-sectional view taken along the line BB' of FIG. 6.

Referring to FIGS. 6 and 7, a radial thrust bushing 55 and a radial bushing 56 are force-fit into a housing 54 and the spindle 21 is to extend through such bushings with a clearance of about 10 μm. A flange 57 for bearing a thrust load is rigidly secured to the spindle 21 by a nut 59 through a collar 58. The radial thrust bushing 55 has mounted thereon a thrust bushing 61 by a spacer 60 in a position engaging the flage 57 between bushing 61 and busing 55. The clearances between the flange 57 and the thrust bushing 61 and radial thrust bushing 55 are about 10 μm.

The surface of the radial thrust bushing 55 which abuts the spindle 21 is provided with four pockets 62 spaced in the circumferential direction, and the surface of the radial bushing 56 which abuts the spindle 21 is also provided with pockets 63a, 63b, 63c and 63d in four circumferentially spaced positions. The pockets 62, 63a, 63b, 63c and 63d are supplied with pressurized oil from the external hydraulic unit 51 (FIG. 3) via a manifold 64 through first oil passages 65 and 66 and chokes or restrictions 67, 68a, 60b, 68c and 68d.

The surfaces of radial thrust bushing 55 and thrust bushing 61 which abut the flange 57 are also provided with pockets 69 and 70, respectively, which are supplied with pressurized oil via first oil passages 65 and a choke or restriction 72 in the same manner as the pockets 62 and 63a–63d.

The hydraulic oil released from the pockets 62, 63a, 63b, 63c, 63d, 69, and 70 flows through the clearance between the spindle 21 and the radial bushing 56 and radial thrust bushing 55 or the clearance between the flange 57 and radial thrust bushing 55 and thrust bushing 61 into the hydraulic unit 51 through second oil passages 72. In FIG. 6, second oil passages 72 are shown as partially omitted. Referring to FIG. 6, the hydraulic oil flowing out of the second oil passages 72 is recovered into the hydraulic unit 51 through third oil passages 73.

In the above manner, the main spindle 21 is supported by a hydrostatic fluid bearing system comprising radial thust bushing 55, radial bushing 56 and thrust bushing 61.

Rigidly secured to the radial bush 56 is a bracket 74 on which is mounted a bearing 75 with the aid of a collar 76 and a nut 77. The pulley 28 is rotatably attached to the bracket 74 by a collar 78 and a retaining plate 79 through bearing 75. A transmission ring 80 is positioned between the retaining plate 79 and the spindle 21, and the retaining plate 79 and the transmission ring 80 are connected together by an elastomeric key 81. Further, the transmission ring 80 and the spindle 21 are connected together by a key 82.

In the arrangement described above, when torque is transmitted to the pulley 28 by the flat belt 27 (FIG. 4), it is transmitted to the spindle 21 by means of the key 81, transmission ring 80 and key 82. Since the spindle 21 is supported by the above-mentioned hydrostatic bearing structure and since the key 81 is made of elastic material, the spindle is rotated with little displacement of its axis.

The slide table section 34 will hereinafter be explained with reference to FIGS. 3, 4, 5, 8, 9, 10, 11, 12, 13 and 14.

Figure 8:
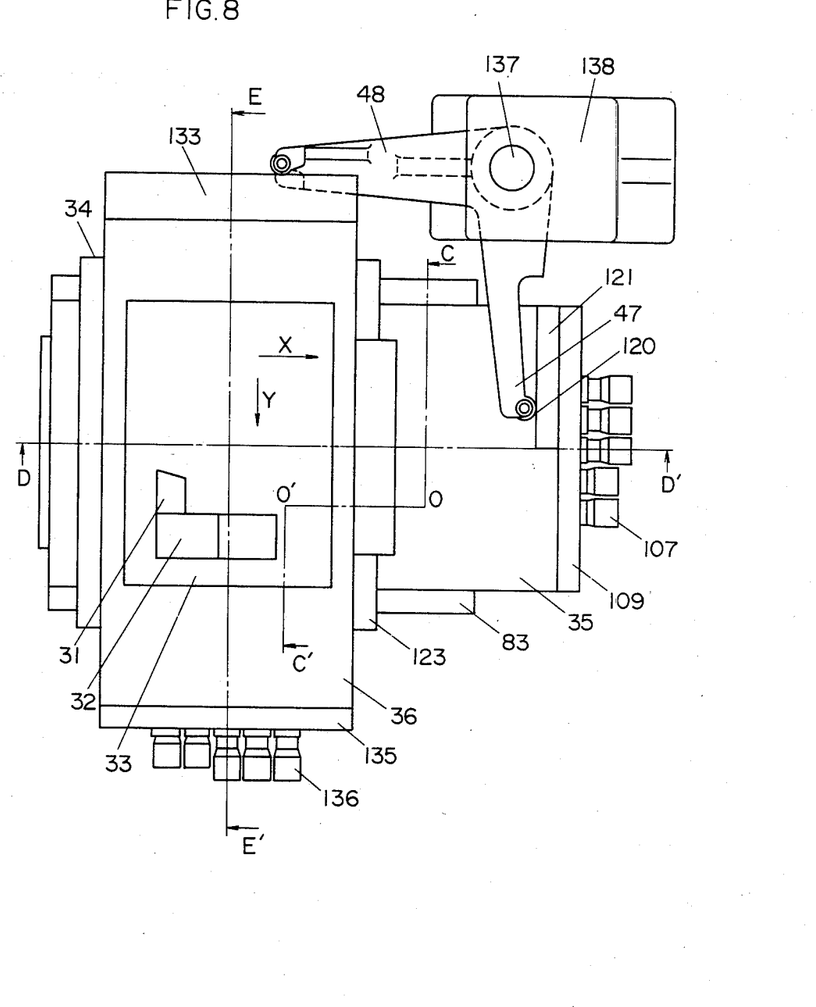
FIG. 8 is a plan view showing the slide table section thereof.

FIG. 8 is a plan view showing the slide table section 34. The tool 31 is secured to the tool mount 33 on the table 36 by means of the tool holder 32. Moreover, the table 36 is mounted on the table 35.

Figure 9:
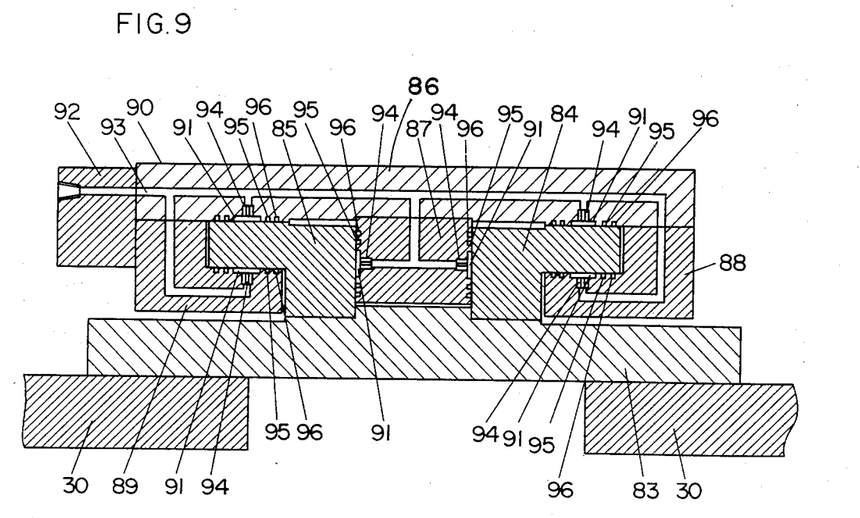
FIG. 9 is a cross-sectional view taken along the line COO'C of FIG. 8.

FIG. 9 is a sectional view taken along COO'C' of FIG. 8, showing the construction of table 35. Referring to FIG. 9, a base plate 83 on frame 30 has guide blocks 84 and 85 rigidly secured thereto. Attached to a top plate 86 are center block 87 and side blocks 88 and 89, forming a movable section 90 slidable along the guide blocks 84 and 85. The surfaces of top plate 86, side blocks 88 and 89 and center block 87 facing guide blocks 84 and 85 are provided with pockets 91 which are supplied with hydraulic oil from the external hydraulic unit 51 through a manifold 92, first oil passage 93 and choke or restrictions 94. The hydraulic oil fowing out of the pockets 91 is recovered into the external hydraulic unit 51 via a second oil passages 95 provided for the recovery of hydraulic oil.

The hydraulic oil flowing further out of second oil passages 95 finds its way through third oil passages 96 and returns to the external hydraulic unit 51.

Figure 10:
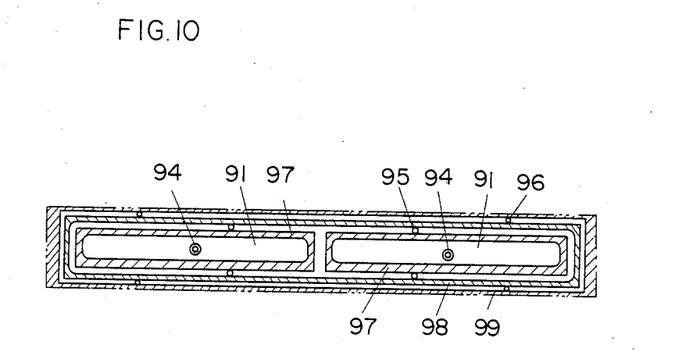
FIG. 10 is a hydrostatic bearing pattern diagram of such slide table section.

The pattern of pockets 91, a second oil passage 95 and a third oil passage 96 is shown in FIG. 10.

Referring to FIG. 10 the hatched areas are raised portions which are generally called "lands". There are provided a first land 97 externally of the pocket 91, a second land 98 externally of the second oil passage 95, and a third land externally of the third oil passage. The clearance between the top plate 86, side blocks 88 and 89, and center block 87 on the one hand and the guide blocks 84 and 85 on the other hand is about 10 μm at the lands 97, 98 and 99.

By the above structures, a hydrostatic fluid bearing is established between the X-direction movable section 90 and the guide blocks 84 and 85. Substantially the same construction is true of the sliding section of the Y-direction table 36.

Figure 11:
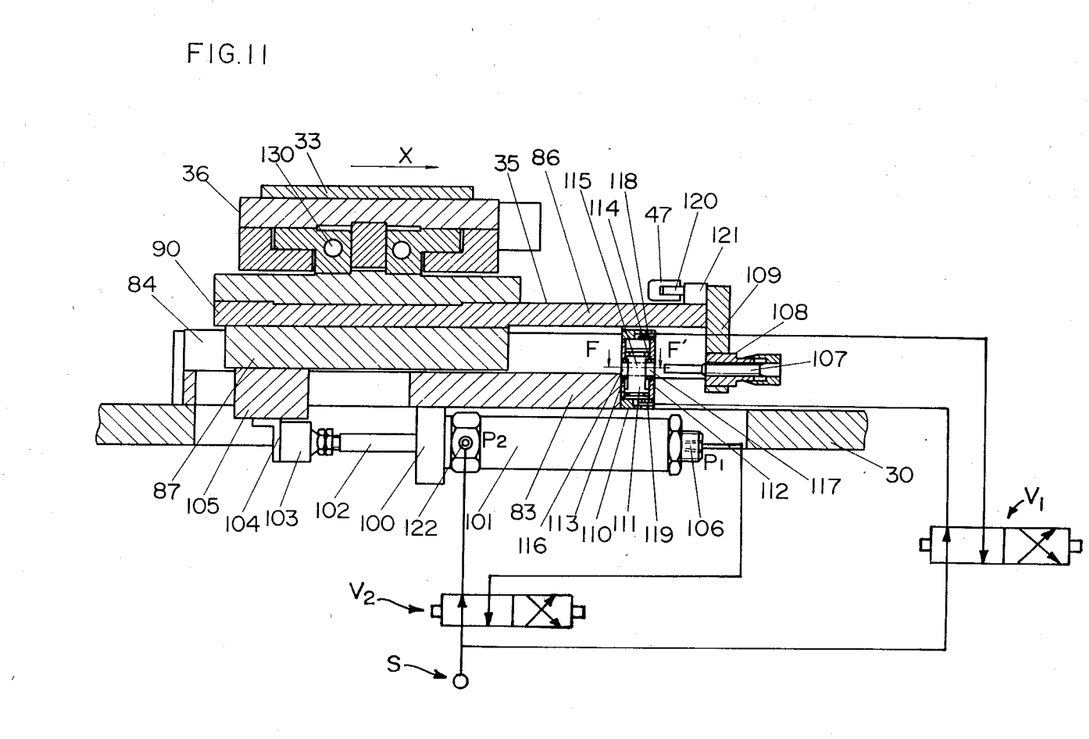
FIG. 11 is a cross-section view taken along the line DD' of FIG. 8.

FIG. 11 is a cross-sectional view taken along the line D, D' of FIG. 8, showing the table 35. To base block 83 is secured an air cylinder 101 as a linear drive means via a block 100. One end of a rod 102 of the air cylinder 101 is secured to the center block 87 through a connector 103, a bracket 104 and a block 105. The air cylinder 101 has an air supply port 106 which is normally supplied with air so that the X-direction movable portion 90 is biased in a direction opposite to the arrow X of FIG. 11.

Secured to the top plate 86 is a stop plate 109 having a nut 108 with a stop screw 107 threaded thereon. Five stop screws 107 are provided for table 35. Connected to the guide block 84 is a stop 110. The stop 110 has five stop pistons 111 corresponding to the five stop screws 107.

The stop pistons 111 are so configured that two flat planes face a cylindrical side plane and are built into a stop body 112. To arrest rotation of stop piston 111, the stop 110 has a pair of blocks 113 and 114. The stop piston 111 and blocks 113, 114 are respectively provided with holes 115, 116 and 117 which are larger in diameter than the stop screw 107. Moreover, the stop 110 is provided with air supply ports 118 and 119 at the top and bottom thereof so that when air is fed to the supply port 118, for example, from a source S and through a two-way valve $V_1$, the stop piston is lowered and the hole 115 in the stop piston 111 comes into alignment with the stop screw 107. As, in this state, the movable section 90 moves in a direction opposite to the direction of arrow X, the stop screw 107, if it reaches the position of the stop position 111, enters into the hole 115 in the stop piston 111 so that the stop screw does not function as a postioning means. However, as air is fed to the air supply port 119, upon reversal of valve $V_1$ as shown in FIG. 11, the stop piston 111 ascends so that since the hole 115 in the stop piston 111 is not aligned with the stop screw 107, the stop screw 107 abuts the stop piston 111, thus positioning the movable section 90.

The top plate 86 is provided with a block 121 which is abutted by an end roller 120 of a lever 47, and normally the movable section 90 is driven by the action of this lever 47.

Figure 12:
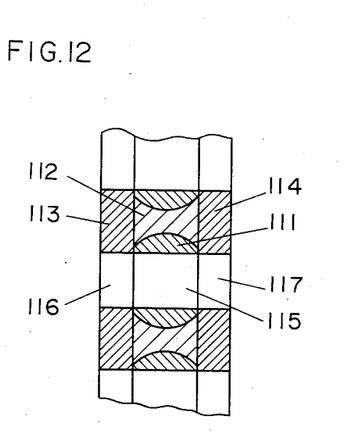
FIG. 12 is a cross-sectional view taken along the line FF' of FIG. 11.
Figure 13:
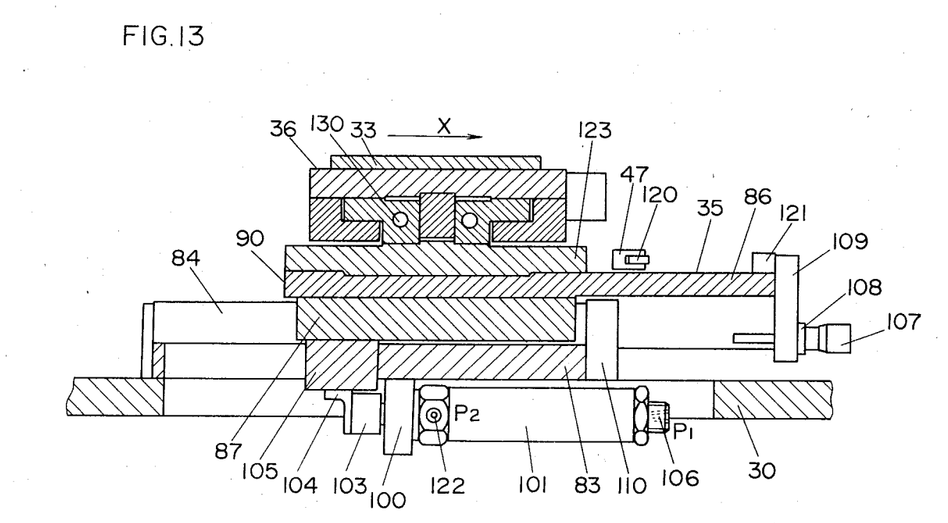
FIG. 13 is a cross-sectional view taken along the line DD' of FIG. 8.

FIG. 12 is a cross-sectional view taken along the line F, F′ of FIG. 11, showing the spatial relationship of stop piston 111, stop body 112 and blocks 113 and 114.

While the movable section 90 is driven by the lever 47, the supply port 106 of the air cylinder 101 is supplied with air, for example, from source S and through a two-way valve $V_2$. However, when air is fed to the supply port 122 of the air cylinder, upon reversal of valve $V_2$ as shown in FIG. 11, the movable section 90 can be driven back, irrespective of the motion of the lever 47, in the direction X shown in FIG. 13, that is to say in the dirction away from the headstock 20. Therefore, the drive of the slide table section 34 during lathe operation is effected with the lever 47, and after operation of the lathe the movable section 90 can be driven back by means of the air cylinder 101. Since the tool is thus moved away from the workpiece after lathe operation, exchange of workpieces is facilitated.

Figure 14:
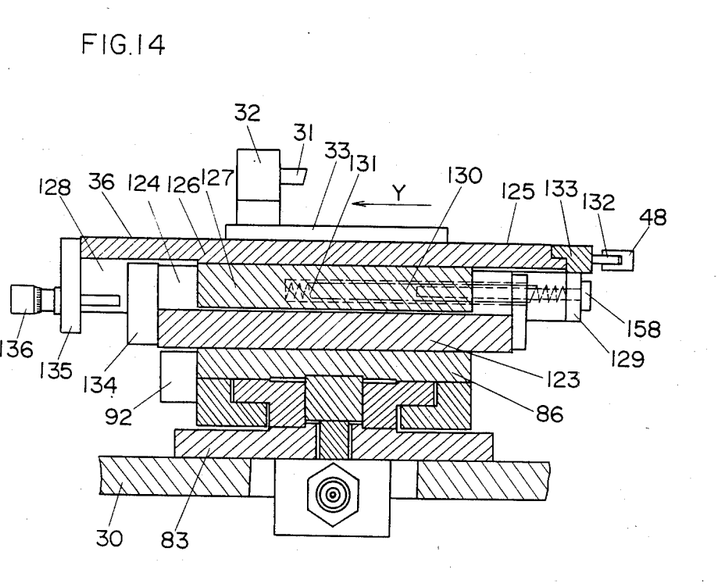
FIG. 14 is a cross-sectional view taken along the line EE' of FIG. 8.

FIG. 14 is a cross-sectional view taken along the line E, E′ of FIG. 8, showing the construction of the table 36.

A base plate 123 attached to the top plate 86 of the table 35 is provided with a guide block 124. On the other hand, a top plate 126 as a component of a Y-direction movable section 125 is provided with a center block 127 and a slide block 128. Rigidly secured to the slide block 128 is a plate 129, while a hole 130 is provided in the guide block 124. A compression spring 131 is interposed between the plate 129 and the guide block 124. A guide bar 158 is a guide for compression spring 131. By this compression spring 131, the movable section 125 is constantly subject to a force biasing the section 125 in a direction opposite to the direction Y indicated by the arrow in FIG. 14. The top plate 126 is provided with an abutting block 133 in a position to be abutted by an end roller 132 of a lever 48. A stop 134, stop plate 135 and stop screw 136 play the same functional roles as in the case of the table 35.

In this embodiment, since the stroke of the X-direction movable section 90 is large and the stroke of the Y-direction movable section 125 is small, an air spring utilizing air cylinder 101 is employed for the table 35 and compression spring 131 for the table 36, but if necessary an air spring may be used in lieu of the compression spring for the table 36.

Figure 15:
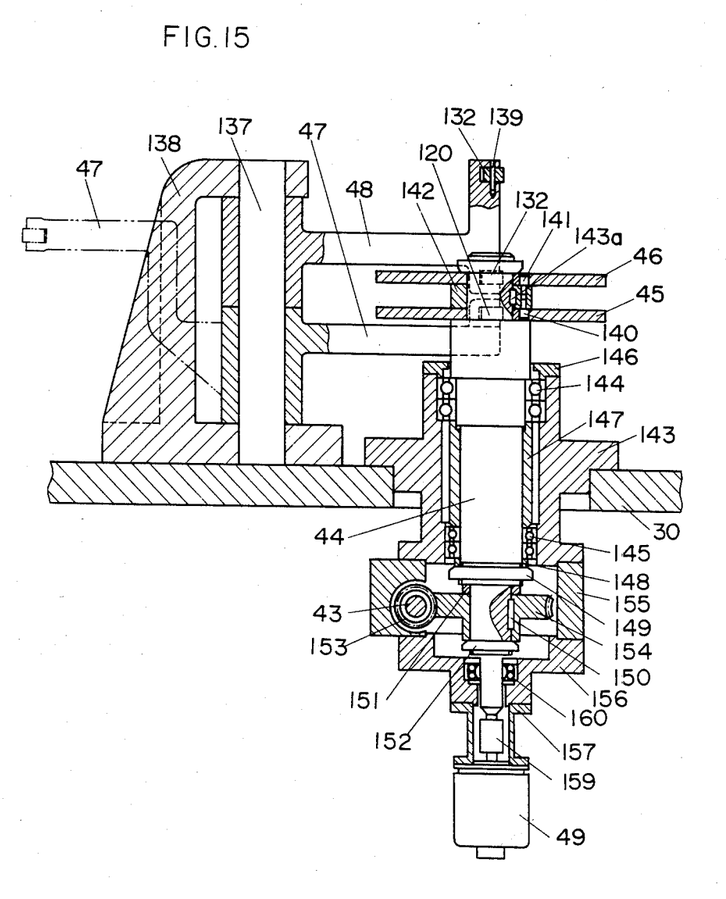
FIG. 15 is a cross-sectional view taken along the line GOO'G of FIG. 3, showing the cam drive section.

The cam drive section depicted in FIG. 15 will now be explained. FIG. 15 is a cross-sectional view on the line GOO′G′ of FIG. 3. The lever 47 adapted to act on the table 35 and the lever 48 adapted to act on the table 36 are rotatably mounted on a lever shaft 137 which is secured to frame 30 through a bracket 138. Rotatably attached to ends of the levers 47 and 48 are rollers 120 and 132 by means of pins 139. One end of the lever 47 abuts the table 35, and the other end abuts an X-cam 45. Similarly, one end of the lever 48 abuts the table 36, with the other end abutting a Y-cam 46. The X-cam 45 and Y-cam 46 are connected to a transmission collar 142 by means of pins 140 and 141, respectively, and the transmission collar 142 is coupled to a cam shaft 44 by means of a key 143a. The cam shaft 44 is mounted on a bearing holder 143 secured to the frame 30 via bearings 144 and 145. A retaining ring 146, spacers 147 and 148 and a nut 149 are provided to mount bearings 144 and 145 on the camshaft 44 and bearing holder 143. The camshaft 44 is further provided with a worm wheel 154 adapted to engage with a worm 153 through a spacer 151 and a nut 152.

Attached to the bearing holder 143 is encoder 49 through a reducer case 155 and brackets 156 and 157, encoder 49 being coupled to the camshaft 44 by means of a connector 159, so that the rotational position of camshaft 44 is detected by encoder 149. It is to be understood that a bearing 160 is designed to inhibit swaying of the end of the camshaft 44. The shaft of the worm 153 depicted in FIG. 15 is the input shaft 43 depicted in FIG. 5 and receives the rotational torque of the camshaft motor 37.

Now, as the camshaft motor 37 is driven, its torque is transmitted to the input shaft 43 via the pulley 39, timing belt 40 and pulley 41. Thereupon the worm 153 is driven so that the X-cam 45 and Y-cam 46 are driven by the wheel 154 and camshaft 44. Then, the table 35 and table 36 are driven by the levers 47 and 48 through the rollers 120 and 132 abutted against the X-cam 45 and Y-cam 46. The rotational position of the camshaft 44 is detected by the encoder 49.

Figure 16:
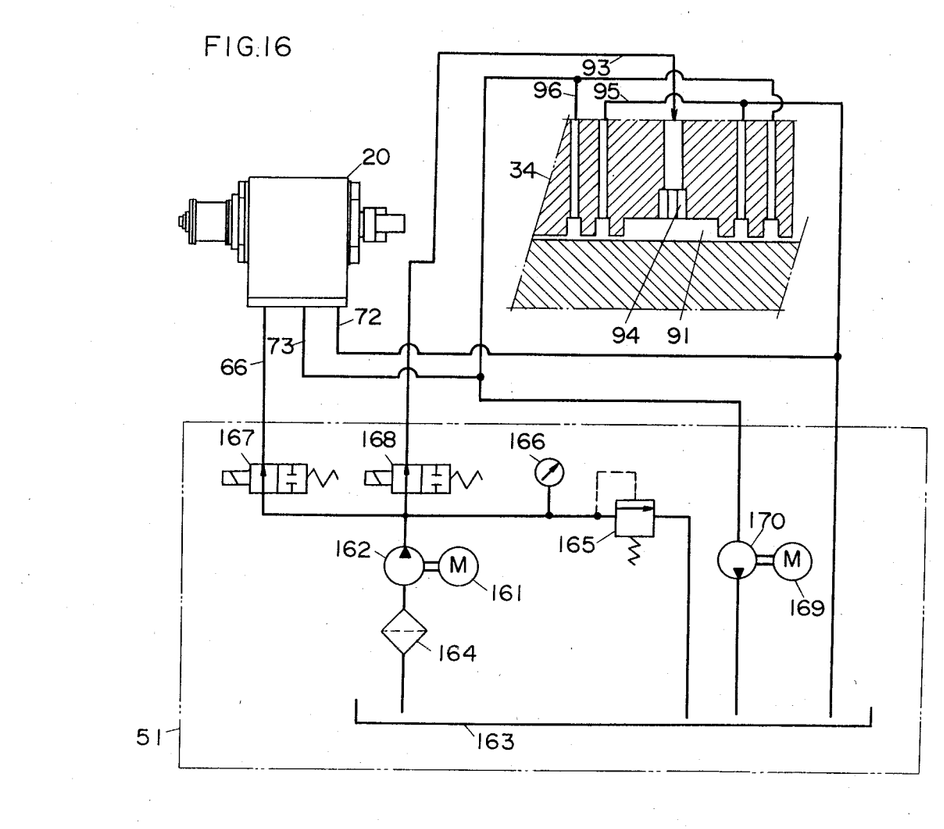
FIG. 16 is a hydraulic circuit of the lathe as the same embodiment of the invention.

The hydraulic circuit of the hydraulic unit 51 which supplies hydraulic oil to the hydrostatic fluid bearing at the headstock 20 and slide section 34 will now be described with reference to FIG. 16.

Hydraulic oil drawn from a tank 163 by a pump 162 driven by a motor 161 is passed through a filter 164 and is pressurized by the pump 162. A relief valve 165 serves to maintain the pressure at a constant level, and the pressure is indicated by a meter 166. The hydraulic oil coming out of the pump 162 is passed through switching valves 167 and 168, a portion of the hydraulic oil being fed to the headstock 20 and another portion to the slide table section 34.

The hydraulic oil coming out of the switching valve 167 is passed through the chokes 67, 68 and 71 shown in FIG. 6 and is fed to the pockets 62, 63, 69 and 70. The hydraulic oil flowing out of the pockets 62, 63, 69 and 70 through the clearance defined by the main spindle 21 and the flange 57 and the radial thrust bushing 55, the radial bushing 56 and the thrust bushing 61 is passed through the second oil passage 72 and is recovered by the tank 163. The hydraulic oil flowing out of the second oil passage 72 is passed through the third oil passage 73 and is recovered by the tank 163.

On the other hand, as shown in FIG. 9, the hydraulic oil coming out of switching valve 168 is passed through the first oil passage 93 and choke 94 and is fed to the pocket 91. The hydraulic oil flowing out of the pocket 91 primarily is recovered by the second oil passage 95. The hydraulic oil flowing out of the second oil passage 95 is recovered by the third oil passage 96. A pump 170 driven by a motor 169 is connected to the third oil passage 96, so that the hydraulic oil in the third oil passage 96 is forcibly drawn in by the pump 170 and recovered to the tank 163.

Generally, in a slide mechanism of the hydrostatic fluid bearing type, hydraulic oil tends to leak out of the equipment, and in order to prevent such leakage, the equipment has to be large. In the embodiment described hereinbefore, the provision of a suction pump 170 in the third oil passage 96 helps prevent leakage of hydraulic oil, and the design of the slide table section can also be simplified.

INDUSTRIAL APPLICABILITY

The positioning device according to this invention having the foregoing construction provides the following advantages.

(1) Since both the X-direction table and Y-direction table have stop means, the two slide tables can be accurately positioned.

(2) Moreover, because driving is effected by levers along both slide tables, the chances of erratic operation are reduced.

(3) Because of the provision of a linear drive means which shifts at least one of the slide tables in isolation from the biasing means and cam and lever mechanism, the slide tables can be shifted to a position that permits easy exchange of tools, workpieces, etc., thus providing an efficient positioning device.

We claim:

1. A positioning device comprising:
   a frame;
   a first table mounted on said frame for sliding movement with respect thereto in first and second opposite directions;
   a second table mounted on said first table for sliding movement with respect thereto in third and fourth directions perpendicular to said first and second directions;
   first and second cams mounted for rotation on said frame;
   first and second pivotally mounted levers having respective first ends contacting said first and second cams, respectively, and respective second ends having rollers adapted to abut ends of said first and second tables, respectively;
   first means mounted on said frame for biasing said first table in said first direction into abutment with said roller of said second end of said first lever;
   first stop means on said frame and said first table and defining a stopping position for limiting the movement of said first table in said first direction;
   second means on said first table for biasing said second table in said third direction into abutment with said roller of said second end of said second lever;
   second stop means on said first and second tables and defining a stopping position for limiting the movement of said second table in said third direction;
   means operatively connected to said first and second cams for rotating said first and second cams and thereby for pivoting said first and second levers, respectively, to control the positions of said first and second tables in said first and second directions and in said third and fourth directions, respectively, under the influence of said first and second biasing means, respectively;
   means operatively connected to at least one of said stop means for rendering inoperative said one stop means when the respective said cam allows the respective said table to be moved by the respective said biasing means beyond the respective said stopping position of said one stop means; and
   at least one of said biasing means including means for interrupting said one biasing means and for moving the respective said table away from abutment with said roller of the respective said lever.

2. A device as claimed in claim 1, wherein said one biasing means comprises an air cylinder normally operated in a direction to move the respective said table into abutment with said roller of the respective said lever and operable in a reverse direction to move said table to a position spaced from such abutment.

3. A device as claimed in claim 1, wherein said one stop means comprises a stop screw mounted on and movable with said respective table, a piston mounted at a fixed position, said piston having therethrough a hole, and means for moving said piston at said fixed position between a first location whereat said stop screw abuts said piston, thereby limiting movement of said respective table, and a second location whereat said stop screw aligns with and may extend through said hole.

4. A device as claimed in claim 1, wherein said first and second tables are supported by hydrostatic fluid bearings.

* * * * *